United States Patent [19]

McMurtry et al.

[11] Patent Number: 5,084,981
[45] Date of Patent: Feb. 4, 1992

[54] PROBE HEAD

[75] Inventors: David R. McMurtry, Wotton-Under-Edge; Thomas B. Jarman, Cirencester; Simon J. Bennett, Painswick, all of United Kingdom

[73] Assignee: Renishaw plc, Gloucestershire, United Kingdom

[21] Appl. No.: 502,870

[22] Filed: Apr. 2, 1990

[30] Foreign Application Priority Data

| Apr. 14, 1989 [GB] | United Kingdom | 8908537 |
| Apr. 14, 1989 [GB] | United Kingdom | 8908538 |
| Dec. 2, 1989 [GB] | United Kingdom | 8927312 |

[51] Int. Cl.⁵ .............................................. G01B 5/03
[52] U.S. Cl. ........................................ 33/556; 33/503; 33/504; 33/559; 33/10
[58] Field of Search .................. 33/556, 558, 559, 561, 33/832, 10, 503, 504, 1 PT, 572; 74/816, 826, 813 C; 200/61.41, 11 K

[56] References Cited

U.S. PATENT DOCUMENTS

| 2,144,972 | 1/1939 | Hirst | 33/1 D |
| 2,834,842 | 5/1958 | Le Beru | 200/11 K |
| 3,024,334 | 3/1962 | Rhodes | 200/11 K |
| 3,277,789 | 10/1966 | Graham | 74/816 |
| 4,168,576 | 9/1979 | McMurtry | |
| 4,289,382 | 9/1981 | Clark | 33/832 |
| 4,313,263 | 2/1982 | McMurtry | 33/503 |
| 4,451,988 | 6/1984 | McMurtry | 33/572 |
| 4,527,023 | 7/1985 | Ohashi et al. | 200/11 K |
| 4,549,359 | 10/1985 | Hense et al. | 33/520 |
| 4,571,847 | 2/1986 | McMurtry | 33/561 |
| 4,593,473 | 6/1986 | Shimomura | 33/832 |
| 4,859,817 | 8/1989 | Cassani | 33/561 |
| 4,888,877 | 12/1989 | Enderle et al. | 33/561 |
| 4,941,266 | 7/1990 | Bissegger et al. | 33/556 |

FOREIGN PATENT DOCUMENTS

| 0317967 | 7/1989 | European Pat. Off. |
| 3712249 | 5/1988 | Fed. Rep. of Germany |
| 1544088 | 12/1969 | France |
| 59-126910 | 7/1984 | Japan |
| 62-142210 | 6/1987 | Japan |
| 2037436 | 4/1983 | United Kingdom |
| 2136574 | 9/1984 | United Kingdom | 33/556 |
| 2139357 | 11/1984 | United Kingdom |
| 2147422A | 5/1985 | United Kingdom |
| 2172707A | 9/1986 | United Kingdom |

OTHER PUBLICATIONS

Product Description for Renishaw Motorized Probe Head, PH9, 9A and 10M.
Product Information for ZEISS DSE 05.
"Renishaw Two Axis Index Head PH8", brochure-1980.
"Renishaw PH9 Automated Inspection System for Measuring Machines": brochure-1980.
Penault Brochure; Photographs of a DEA Head and Mitutoyo Head (Catalog No. 4127).

Primary Examiner—Allan N. Shoap
Assistant Examiner—Alvin Wirthlin
Attorney, Agent, or Firm—Oliff & Berridge

[57] ABSTRACT

A probe head for orientating a probe relative to a head of a coordinate measuring machine, has a support a rotor rotatable relative to the support, and a swivel rotatable relative to the rotor. The rotor and swivel are mounted for rotation through a series of discrete, and repeatable rest positions. The relative orientation of support, rotor and swivel is detected by an indicating mechanism comprising a printed circuit board having a series of electrical conductive elements and a contact arm mounted for rotation over the conductive elements on the circuit board. When the electrical contacts of the contact arm come into register with the conductive elements on the circuit board a pulse is transmitted to a micro-processor which determines the relative orientation of e.g. the support and rotor which is shown on the LCD. The micro-processor may also provide instructions (on the LCD) indicating in which direction the rotor should be moved in order to attain a predetermined position stored in a memory of the micro-processor; an indication is provided on the LCD that such a predetermined position has been attained.

22 Claims, 11 Drawing Sheets

1

PROBE HEAD

BACKGROUND OF THE INVENTION

The invention relates to a probe head, used for example, to orientate a probe relative to a quill of a coordinate measuring machine.

1. Description of Prior Art

It is known to provide a motorised probe head having a support for mounting the probe head to the quill of a coordinate measuring machine, a first rotor mounted to and for rotation relative to the support, and a second rotor mounted to and for rotation relative to the first rotor. The second rotor carries a connector for connecting a workpiece-sensing probe to the probe head. To move the probe head from one relative orientation to another, position demand data is programmed into a suitable micro processor, and instructions are sent to the motors of the probe head. This enables the probe to be orientated in any desired direction, to facilitate measurements of complex-shaped workpieces.

2. Summary of the Invention

The present invention provides a manually operable probe head, having a support, a rotor mounted to, and for rotation relative to the support about an axis, the rotor being mounted for seating in, and rotation between a plurality of rest locations, and an indicating mechanism provided on the probe head for storing data corresponding to a predetermined position of the rotor relative to the support and for displaying when the rotor is in said predetermined position.

In one preferred embodiment of the present invention the means for storing data and the signalling means may be respectively provided by a markable scale on one of said rotor and support, and a reference mark adjacent the scale on the other of said rotor and support.

The indicating mechanism preferably also further comprises means provided on the probe head for generating signals, each signal corresponding to a unique position of the rotor relative to the support, and means for displaying on the probe head an instantaneous position of the rotor relative to the support.

Preferably, the indicating mechanism further comprises a memory for storing at least one of said signals corresponding to a said predetermined position, and means for indicating coincidence between a signal stored in the memory and a signal from the signal generator.

The indicating means also preferably further comprises means for generating from said signals an instruction for moving the rotor from a position other than a said predetermined position, to a said predetermined position, and for displaying the said instruction on the probe head.

A second preferred embodiment of indicating mechanism provides a markable scale provided on one of the rotor and support and a reference mark adjacent the other of said rotor and support.

BRIEF DESCRIPTION OF THE DRAWINGS

Embodiments of the invention will now be described, by way of example, and with reference to the accompanying drawings in which.

DESCRIPTION OF THE PREFERRED EMBODIMENTS

Figure 1:
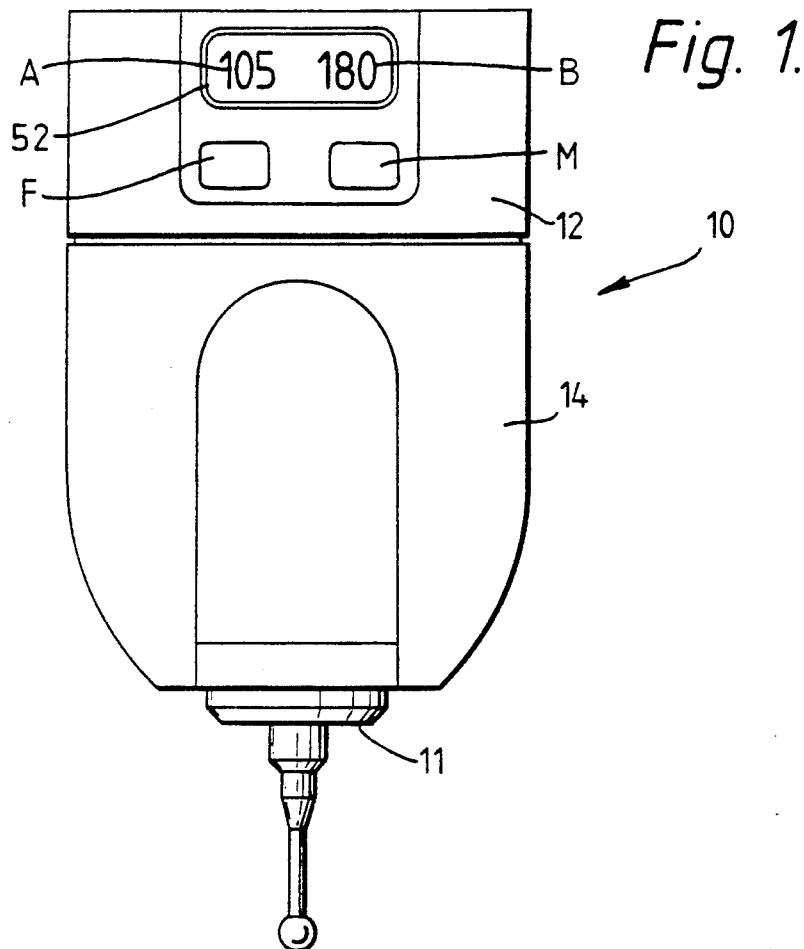
FIG. 1 shows an embodiment of a probe head according to the present invention.

Referring now to FIGS. 1 to 4, a probe head for orientating a probe 11 is generally indicated by a reference numeral 10 and has a cylindrical support 12 (by which the probe head may be connected to a quill of a coordinate measuring machine) and a dome shaped rotor 14 mounted for rotation relative to the support 12 about an axis 16. A swivel 18 is mounted inside the dome shaped rotor 14 for rotation about an axis 20, which is perpendicular to the axis 16.

Both the rotor 14 and the swivel 18 are mounted for rotation between, and seating in, a plurality of kinematic rest locations. Three cylindrical rollers 22, mounted in the upper face 24 of rotor 14, extend radially with equal angular spacings about the axis 16. A ring of balls 26 are mounted in the base of the support 12, concentric with axis 16, at $7\frac{1}{2}°$ intervals. When the support 12 and rotor 14 are urged together, each of the rollers 22 seats in a cleft defined by the converging surfaces of an adjacent pair of balls 26; the rotor 14 may then be said to be kinematically supported with respect to support 12. The ring of balls 26 provides forty eight such kinematic locations. An identical arrangement is provided in respect of swivel 18 and rotor 14, the cylindrical rollers 28 seating in the clefts provided by a ring of balls 30 mounted on the interior of the rotor 14.

To effect movement of the support 12, relative to the rotor 14 and rotor 14 relative to swivel 18, the three components must first be disengaged from each other, by relative movement along axis 16 of the support 12 and rotor 14 and of the swivel 18 and rotor 14 along axis 20. This is achieved by rotating knurled wheel W, to rotate a cam 32 and retract a tie-bar T. The mechanism providing engagement and disengagement (i.e. 'locking' and 'unlocking') of the three components is described in the Applicant's concurrently filed co-pending patent application Ser. No. 07/497,654, claiming priority from UK patent applications GB 8908537.7 and GB 8927312.2 and is not discussed further here.

Because the probe is manually operated, it is desirable to provide an indicating mechanism, which provides information indicating the relative position of support 12, rotor 14, and swivel 18. The indicating mechanism helps to prevent, for example, effecting re-engagement of the three components in an incorrect position.

The indicating mechanism of this embodiment consists of a pair of wiper systems for generating signals corresponding to the relative position of the three components, a microprocessor for processing the signals, storing data, and generating instructions for movement of the three components from one relative position to another, and a liquid crystal display for displaying the various outputs of the microprocessor. The wiper systems may provide absolute or incremental signals to the microprocessor for the purpose of indicating the relative orientation of support 12 and rotor 14, and of the rotor 14 and swivel 18. The wiper systems used in the present embodiment are incremental systems.

Figure 5:
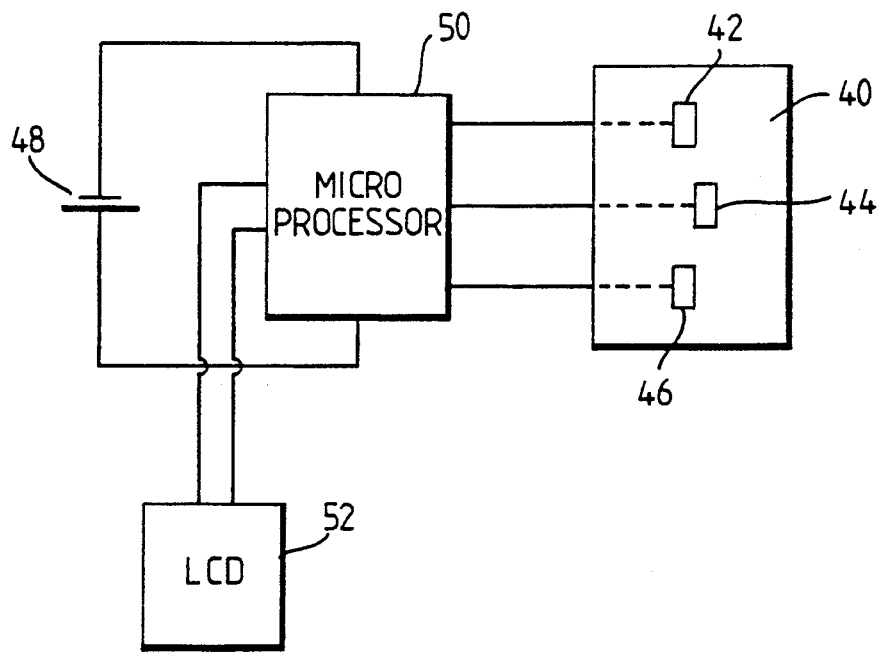
FIG. 5 shows a detail of the probe head in FIG. 2.
Figure 2:
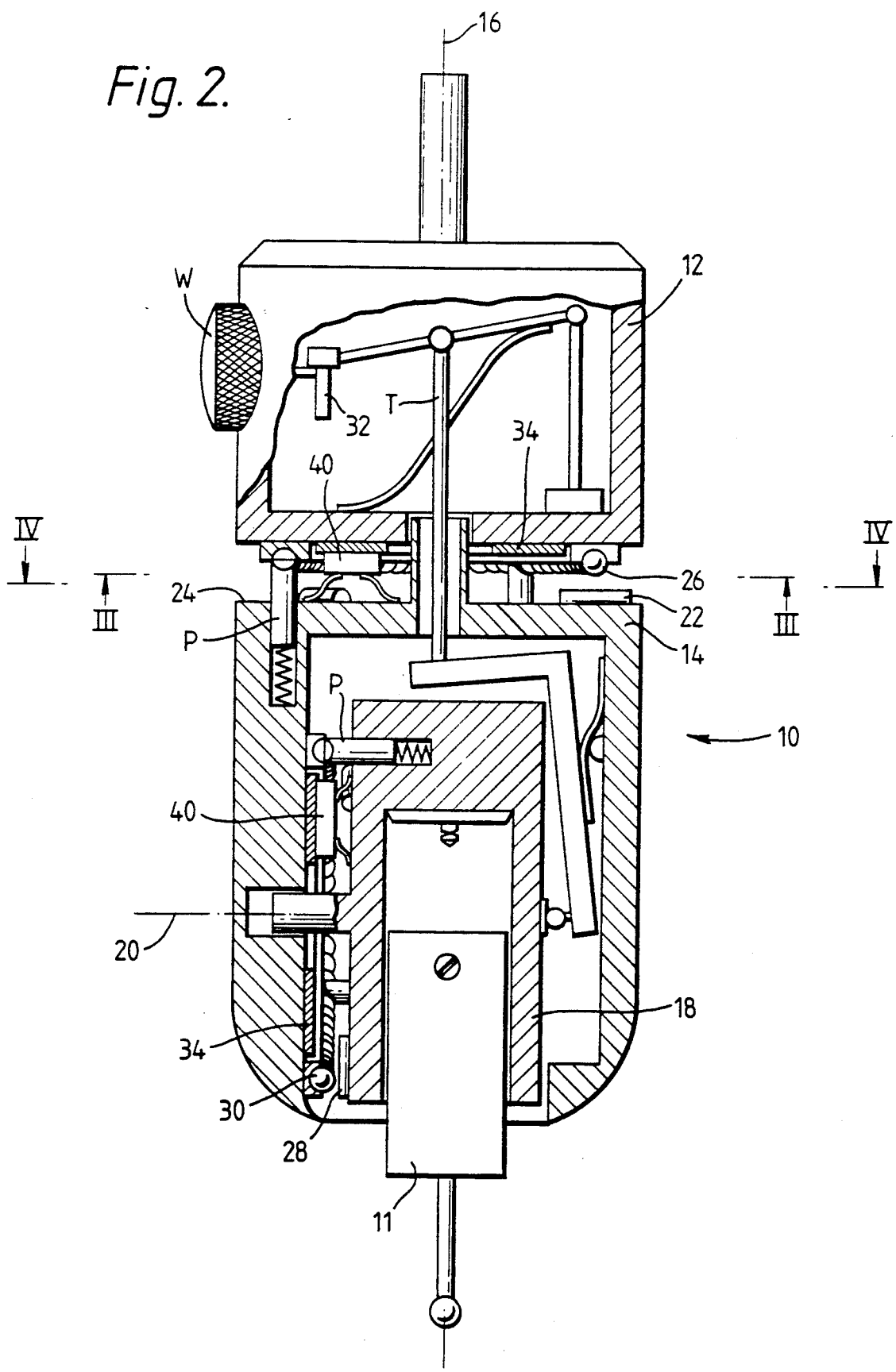
FIG. 2 is a section through the probe head shown in FIG. 1.
Figure 3:
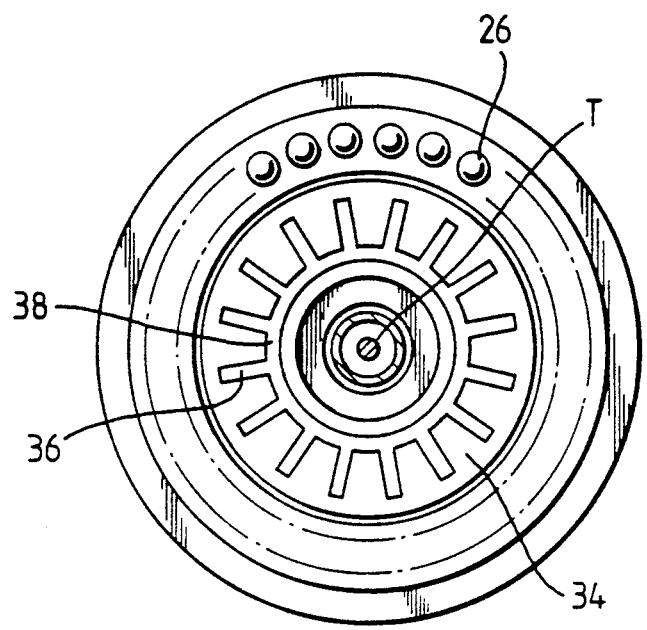
FIG. 3 is a section on III—III of the probe shown in FIG. 2.
Figure 4:
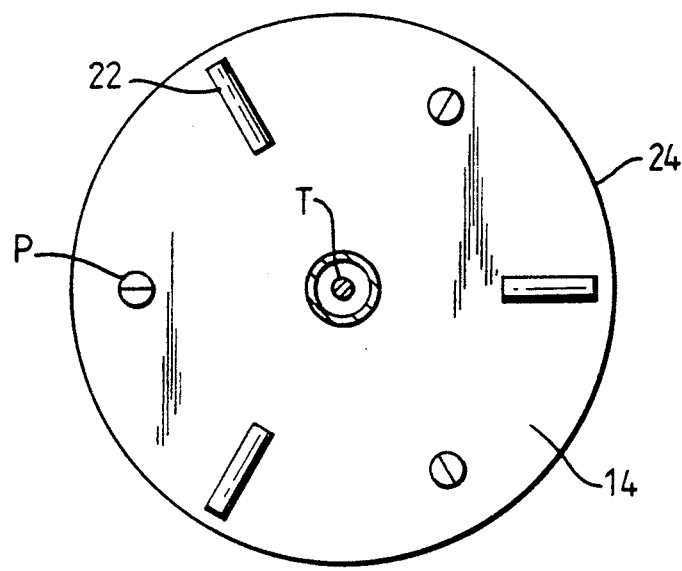
FIG. 4 is a section on IV—IV in the probe head of FIG. 2.

An indicating mechanism will now be described in more detail with reference to FIGS. 2, 3 and 5. A printed circuit-board 34 is provided on each of the support 12 and rotor 14, and has a series of radially extending electrical conductive elements 36 each linked to a common circumferentially extending conductive element 38. A spring-loaded contact arm 40 mounted on each of the rotor 14 and swivel 18 presses against the electrical contacts 36 and 38 on the circuit board 34. The contact arm 40 is shown in FIG. 5 and carries three contacts: contacts 42 and 44 for contacting the radially extending conductive elements 36, and contact 46 for contacting the conductive element 38. Contacts 42 and 44 are slightly offset from each other so that they will come into register with the elements 36 at different instants in time and this provides information on the direction of rotation of e.g. rotor 14 relative to support 12.

A battery 48 is connected in parallel with a microprocessor 50, which is in turn connected in series to each of the contacts 42 to 46 on contact arm 40, thus providing a voltage across contact pairs 42-46 and 44-46. A liquid crystal display 52 is also connected to the microprocessor 50, which, in response to voltage pulses across contact pairs 42-46 and 44-46 generated when the contacts 42 and 44 come into register with the conductive elements 36, instructs the display 52 to give a visual signal representing the relative orientation of swivel 18 and rotor 14. The microprocessor 50 has a plurality of memories for storing position data.

Figure 6A:
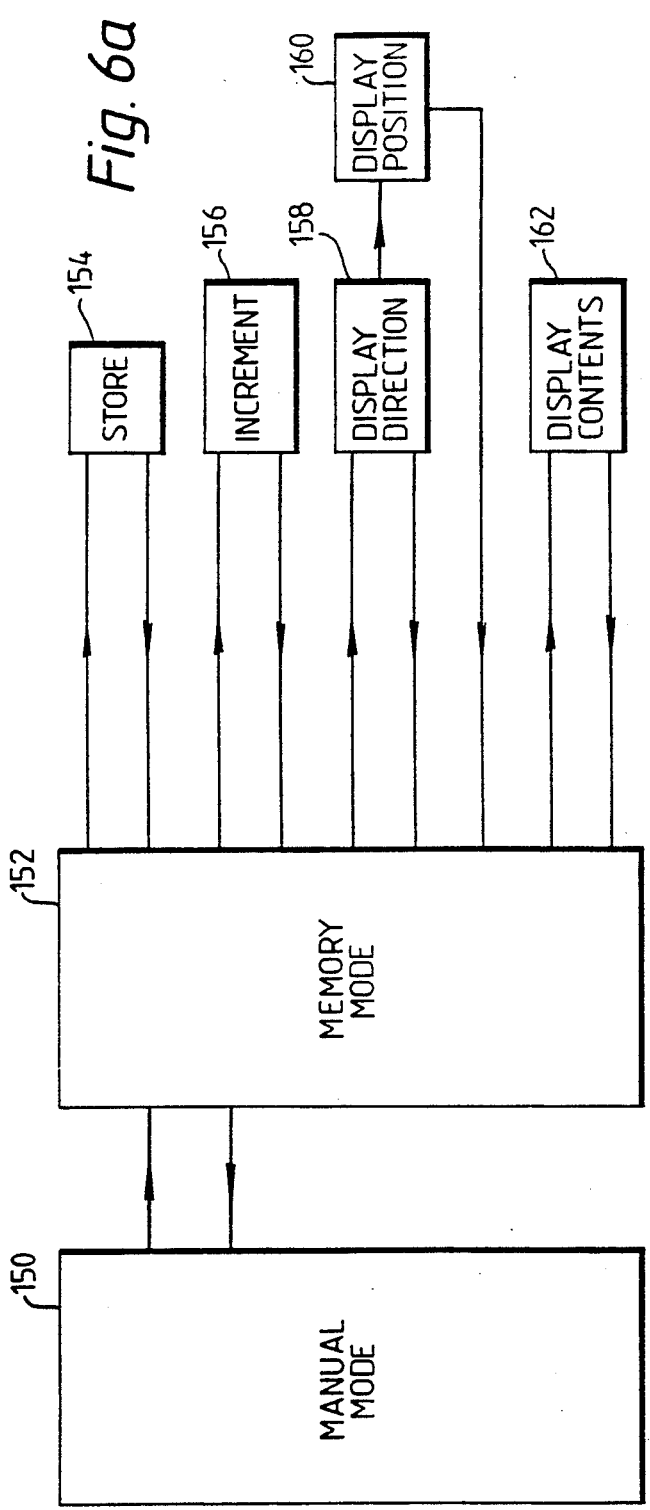
FIGS. 6a and 6b show flow charts indicating the modes of operation of an indicating mechanism in a first embodiment of a probe head according to the present invention.
Figure 6B:
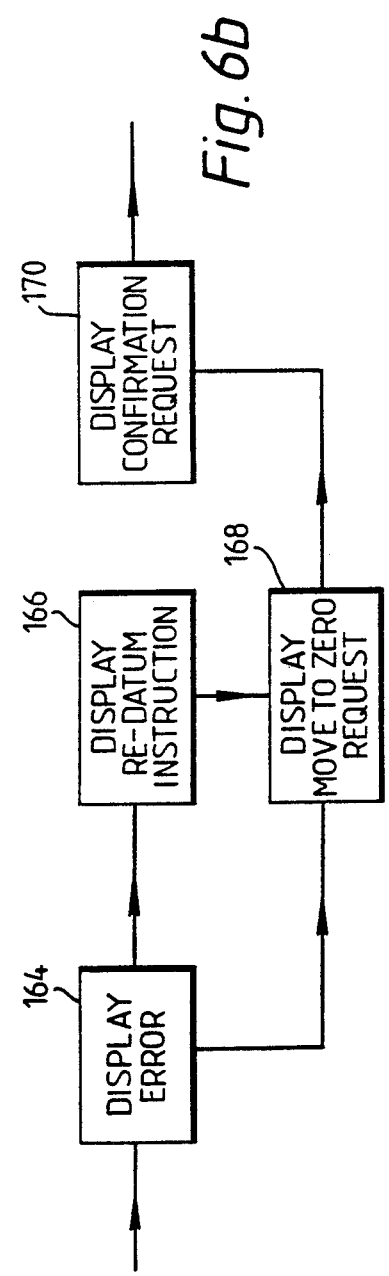

The indicating mechanism has a number of modes of operation, each of which provides the user with different information and/or enables him to store different position data. The various modes and the relationship between them will now be described with reference to FIGS. 6a and 6b. Here, the arrows joining the blocks indicate that it is possible to move from one mode of operation to another. This is done using buttons M and F, as described later.

The various modes are as follows:

150 - MANUAL MODE. In this mode, the orientation of the support 12 relative to the rotor 14 (display A in FIG. 1) and the rotor 14 relative to the swivel 18 (display B in FIG. 1) are displayed on the LCD 52, but no memory information or instructions are generated or displayed.

152 - MEMORY MODE. As with the manual mode, the relative positions of the support 12, rotor 14 and swivel 18 are displayed on the LCD 52, however the memory mode additionally provides the following sub modes:

154 - Store current position in memory. 156 - Increment memory number (i.e. moving from one memory to the next) 158 - Display direction instructions for relative movement of the three components to the position stored in the memory number last displayed on the LCD. The LCD displays arrows showing the user which directions the rotor 14 and swivel 18 should be moved. 160 - Switch from mode 158 to a display of the relative orientations.

162 - Display contents of memory for three seconds.

Because the wiper mechanism provides incremental signals, the microprocessor must 'count' the signals from contact arm 40 in order to provide an output representing the relative orientation of e.g. the support 12 and rotor 14. There is a predetermined rate of input of signals from contact arm 40 above which the microprocessor is unable to count. Therefore if e.g. the rotor 14 is moved relative to the support 12 at a speed which generates signals from the wiper mechanism at a rate greater than the predetermined rate, the microprocessor is unable to count and therefore goes into an 'error overspeed mode'. The operation of the error overspeed mode will now be described with reference to FIG. 6b.

164 - Display error signal due to overspeed 166 - Display re-datum (i.e. re-calibrate) instruction (this is applicable only when the head is mistakenly locked without re-datuming after an error signal has been displayed) 168 - Display request for user to orient the probe head to a zero position of swivel 18, rotor 14 and support 12 which is typically defined in advance. 170 - Display request to confirm that probe head is in zero position.

As mentioned above, two input buttons F and M are provided on the panel containing LCD 52, and the user may change from one mode to another, and/or instruct the micro-processor to store position data by actuating these buttons as follows:

Mode 152 to mode 150: Depress button F for at least three seconds. Mode 150 to mode 152: Depress button F. Mode 152 to mode 154 (and vice versa): Depress button F and button M simultaneously.

Mode 152 to mode 156 (and vice versa): Depress button M. Mode 152 to mode 158: Unlock the probe head. Mode 158 to mode 152: Lock the probe head. Mode 158 to mode 160: Depress button F. Mode 160 to mode 152: Lock the head. Mode 152 to mode 162: Depress button F for less than three seconds (mode 62 provides an automatic return to mode 152 after three seconds).

The user may progress through the overspeed error mode using the following instructions:

Overspeed error - enter mode 164. Mode 164 to mode 166: Lock head and depress button F or M. Mode 164 to mode 168: Unlock head and depress button F or M. Mode 166 to mode 168: Unlock head. Mode 168 to mode 170: Lock head. Exit mode 170 to mode 150: Depress F or M.

Figure 7A:
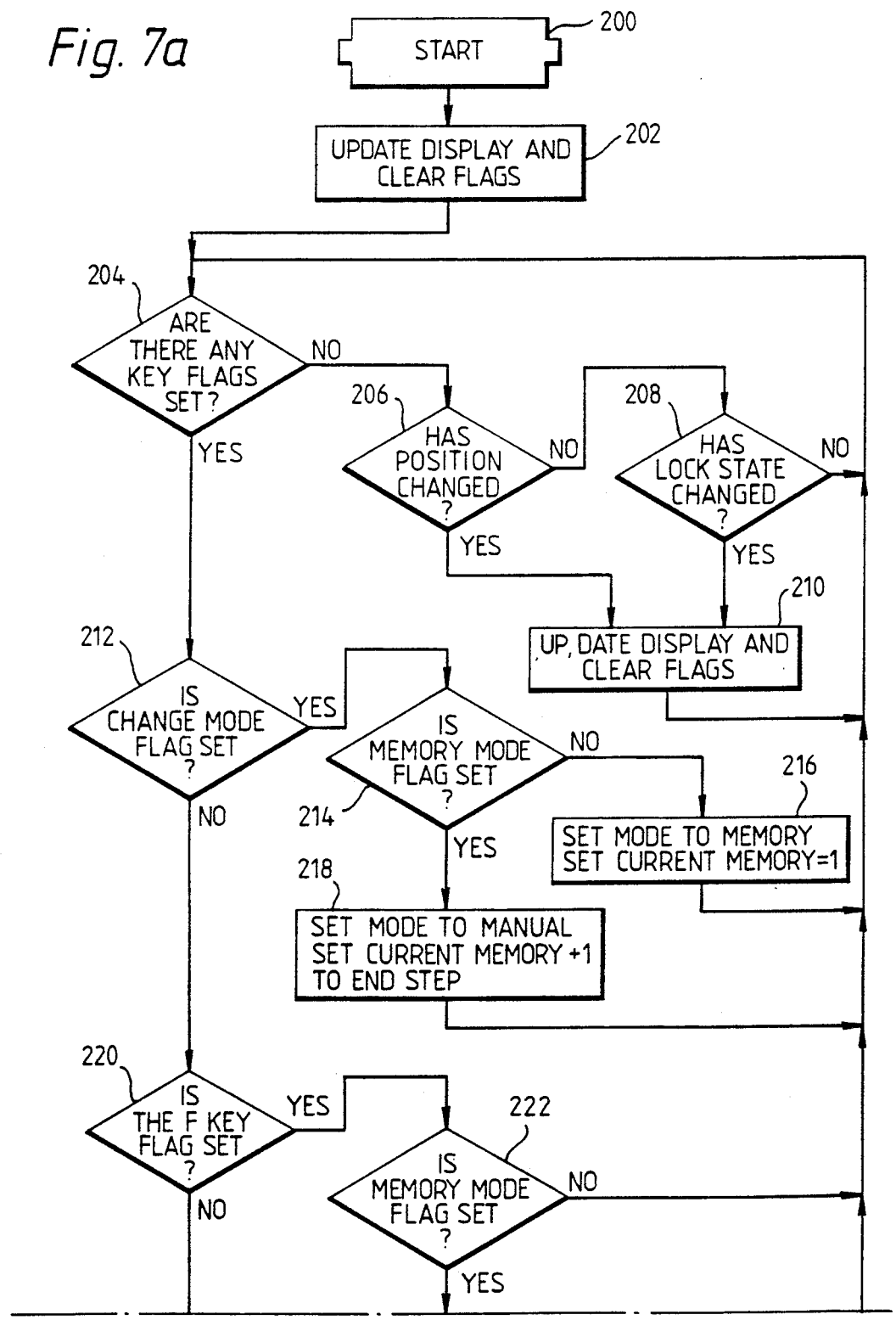
FIGS. 7a to 7c show flow charts for operation of the microprocessor of the indicating mechanism of the first embodiment.
Figure 7B:
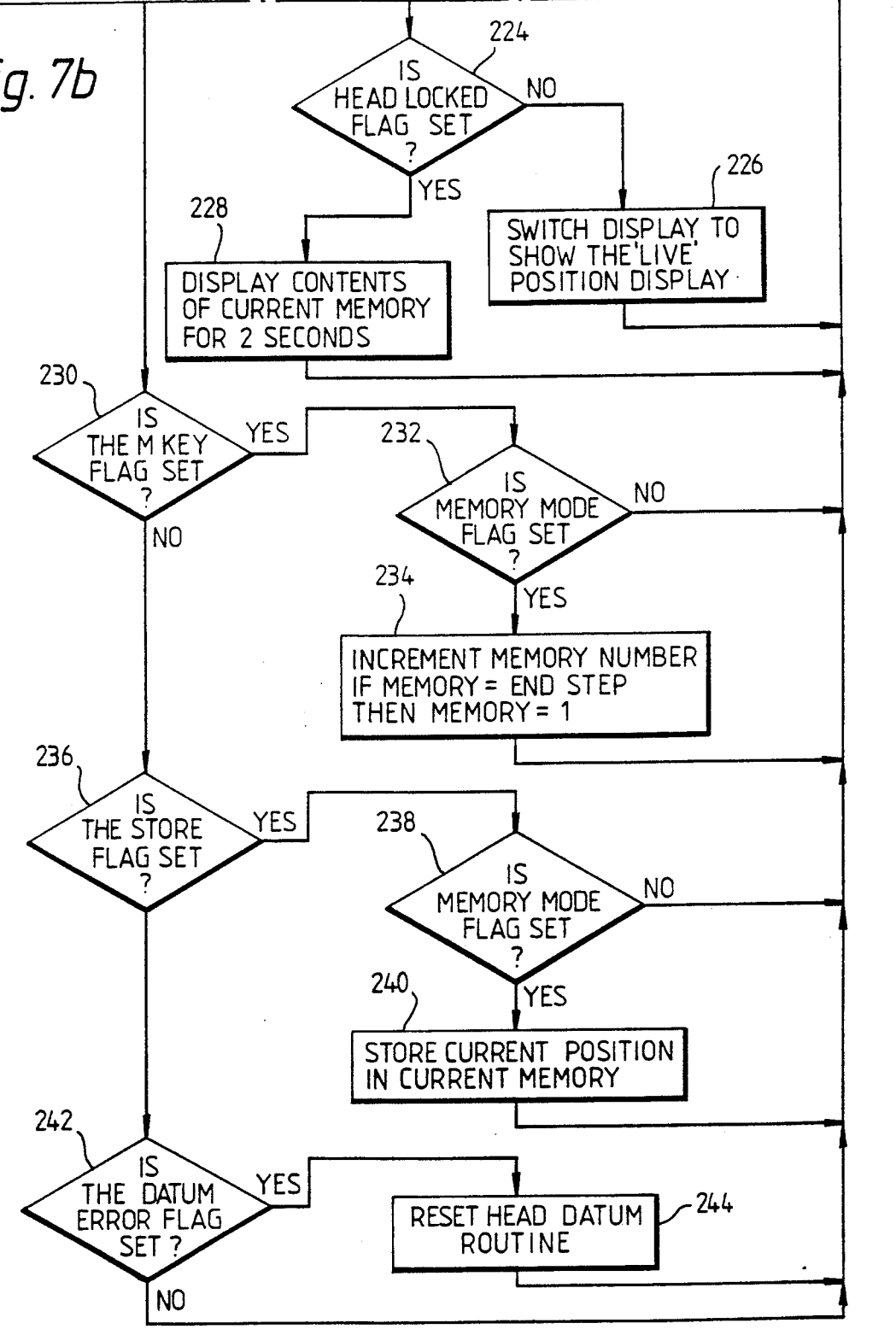
Figure 7C:
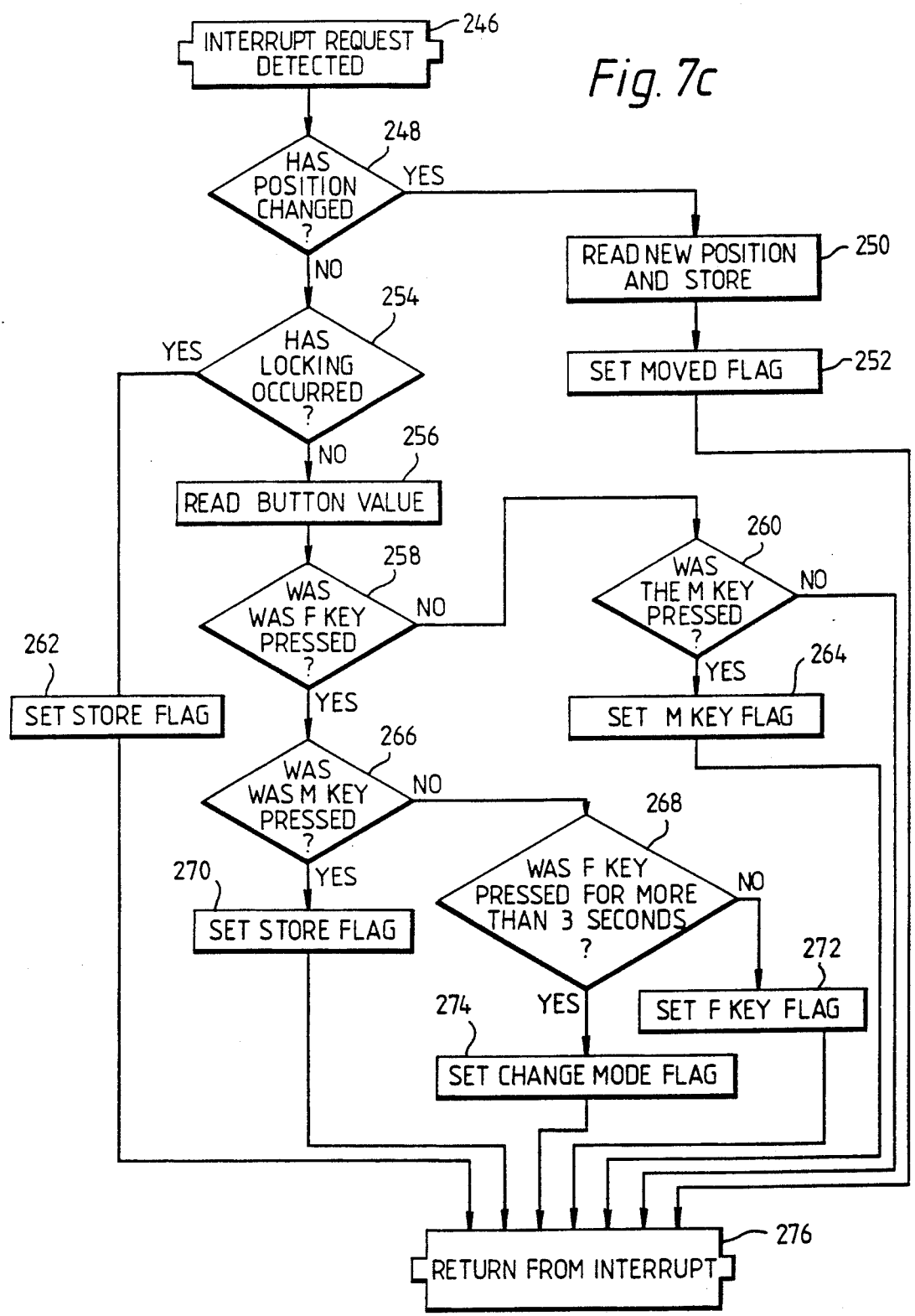
Figure 8:
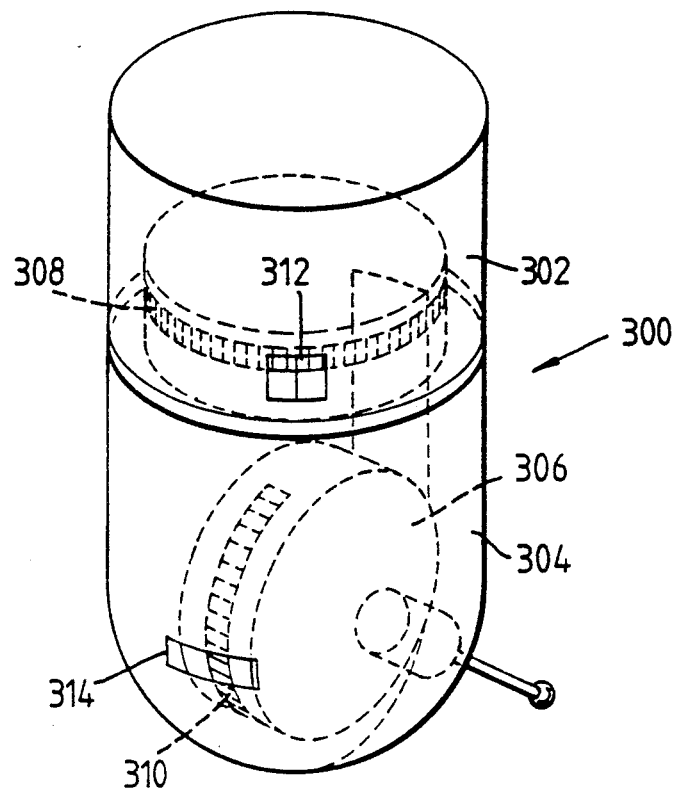
FIG. 8 is a perspective view of a second embodiment of the present invention.

Details of the software in the microprocessor are as follows (referring to FIGS. 7a, 7b and 7c):

200 - Start 202 - Update display and clear flags 204 - Are there any key flags set? 206 - Has position changed? 208 - Has lock state changed? 210 - Update display and clear flags 212 - Is change mode flag set? 214 - Is memory mode flag set? 216 - Set mode to memory, set current memory=1 218 - Set mode to manual, set current memory+1 to end step. 220 - Is the F key flag set? 222 - Is memory mode flag set? 224 - Is head locked flag set? 226 - Switch display to show the 'live' position display 228 - Display contents of current memory for 2 seconds 230 - Is the M key flag set? 232 - Is memory mode flag set? 234 - Increment memory number if memory=end step then memory=1 236 - Is the store flag set? 238 - Is memory mode flag set? 240 - Store current position in current memory 242 - Is the datum error flag set? 244 - Reset head datum routine 246 - Interrupt request detected - (any movement of the rotor or swivel and any user input, generates an interrupt signal to the microprocessor) 248 - Has position changed? 250 - Read new position and store 252 - Set moved flag 254 - Has locking occurred? 256 - Read button value 258 - Was the F key pressed? 260 - Was the M key pressed? 262 - Set store flag 264 - Set M key flag 266 - Was the M key pressed? 268 - Was F key pressed for more than 3 seconds? 270 - Set store flag 272 - Set F key flag 274 - Set change mode flag 276 - Return from interrupt Referring now to FIG. 8, a second embodiment of the present invention provides a probe head 300, comprising a support 302, a rotor 304, and a swivel 306. In the same manner as the first embodiment, the rotor 304 and swivel 306 are mounted for rotation between a plurality of kinematic locations.

An indicating mechanism is provided for each of the rotor 304 and swivel 306, and to this end the bodies of rotor 304 and swivel 306 are both provided with a scale 308 and 310 respectively. A window 312, provided in the body of the support 302, and a window 314, provided in the body of the rotor 304, enable a small part of the scales 308 and 310 to be seen.

Thus, when the probe head 300 is locked in a given position, each of the scales 308 and 310 can be marked with a reference mark adjacent a suitable reference point provided in the window, thus enabling a record of that particular relative orientation of the support 302, rotor 304, and swivel 306, to be made. The marks can be made with coloured pens. For a given orientation which is to be recorded, the same colour is used in each window. Different colours are used to identify different orientations. If, after the probe has been re-oriented to another position, it is desired to return the probe head to its previous orientation, a simple observation of the scales 310 and 312 will enable the operator to determine when the previous position has been reached (by ensuring that the markings made on each of the scales 310 and 312 come into register with the reference mark on the window), and the three components 302, 304 and 306 of the probe head may then be locked into engagement with each other.

By using more than one coloured pen, and assigning to each colour one given relative orientation it is possible to provide an easily readable memory of extremely large capacity.

The coloured pens are preferably felt-tip pens, and the scales are preferably made of a material from which the marks can easily be erased by wiping.

Figure 9:
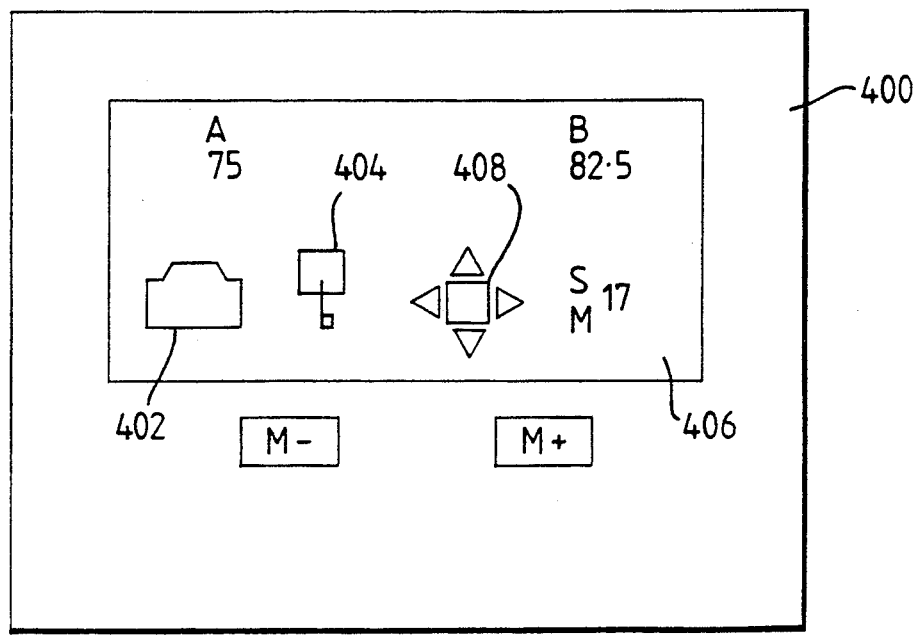
FIG. 9 is a display according to a third embodiment of the present invention.

A third, and preferred embodiment of the present invention will now be described with reference to FIGS. 9 to 13. The probe head of this embodiment has the same construction as that described in FIGS. 2 to 5, but the indicating mechanism has a different liquid crystal display and modes of operation. Referring now to FIG. 9, a liquid crystal display 400 has two buttons M+ and M— which are used to move between different modes of operation, and enter data into the system. As with the previous liquid crystal display, the orientation of the support 14 relative to the rotor 12 is displayed in terms of an angle under the label A, and the orientation of the swivel 18 relative to the rotor 14 is displayed in terms of an angle under the label B. Also provided on the display 400 are a battery symbol 402 which indicates when the battery operating the indicating mechanism is coming to the end of its life, a key sign 404, which indicates that the head is locked, a memory display 406 which displays the letter "M" and a memory number, and a directional display 408 having four arrows which indicate required directions of movement of rotor 14 and swivel 18 and a central box which indicates that the desired movement as indicated by the arrows has been completed.

Figure 10:
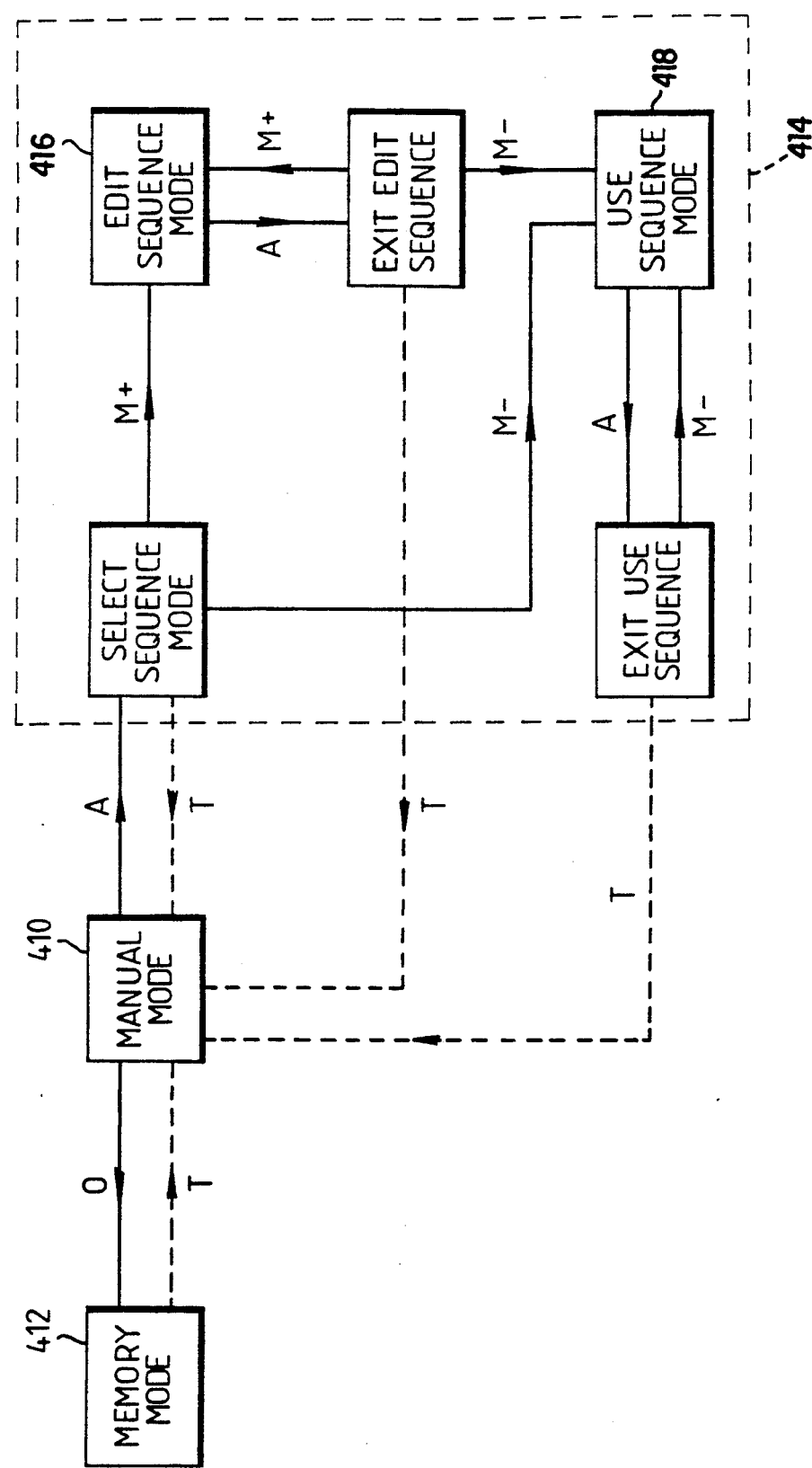
FIG. 10 is a flow chart indicating modes of operation of an indicating mechanism in the third embodiment of the present invention.

The various modes of operation of the third embodiment of the present invention will now be described with reference to FIG. 10:

410 - MANUAL MODE. This mode is simply a mode in which the head gives visual feedback information on the relative angular displacement of support 12 rotor 14 and swivel 18. When the head is unlocked only the current position is displayed, however when the head is locked the current position is displayed along with the key sign 404, and also if the current position is one which is stored in the memory, the memory number (the memory number is displayed without the letter "M") indicating that the head is in manual mode.

412 - MEMORY MODE. The display 400 indicates to the user that he is in the memory mode by the presence of the M on the memory display. When the head is locked the displays A and B show the angular displacement of the position corresponding to the memory number shown on the memory display 406, and the direction display 408 shows one, or where appropriate two arrows indicating the direction in which the rotor 14 and/or swivel 18 of the head should be moved to attain the memory position displayed. When the head is unlocked the displays A and B indicate the actual angular position of the parts of the probe head, together with the aforementioned arrows.

414 - SEQUENCE MODE. The display 400 indicates to the user that he/she is in the sequence mode by the presence of an S. This consists of two sub-modes;

(i). 418 - USE SEQUENCE MODE. In this mode, the display 400 instructs the user how to move between a sequence of predetermined memory positions (each known as a sequence step), using the direction display 408.

(ii). 416 - EDIT SEQUENCE MODE. In this mode, the user has the opportunity to edit the sequences of memory numbers.

Figure 11:
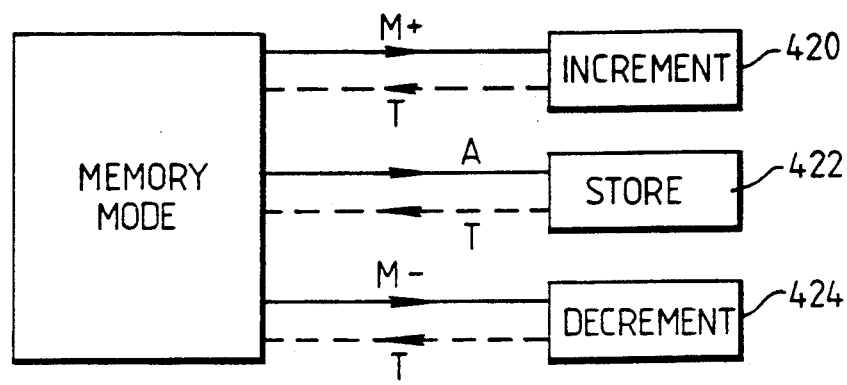
FIGS. 11 to 13 show flow charts indicating details of the modes shown in FIG. 10.

The memory mode has three sub-modes, shown in FIG. 11 as follows:
420 - Increment the memory number (i.e. moving from one memory to the next). 422 - Store current position in memory. 424 - Decrement memory number.

Figure 12:
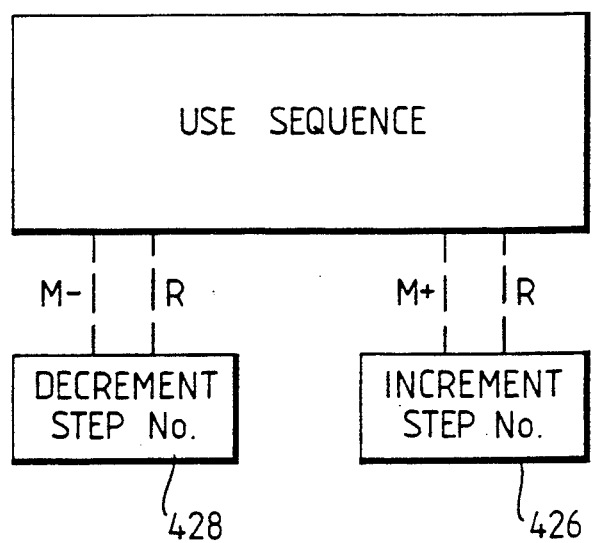
Figure 13:
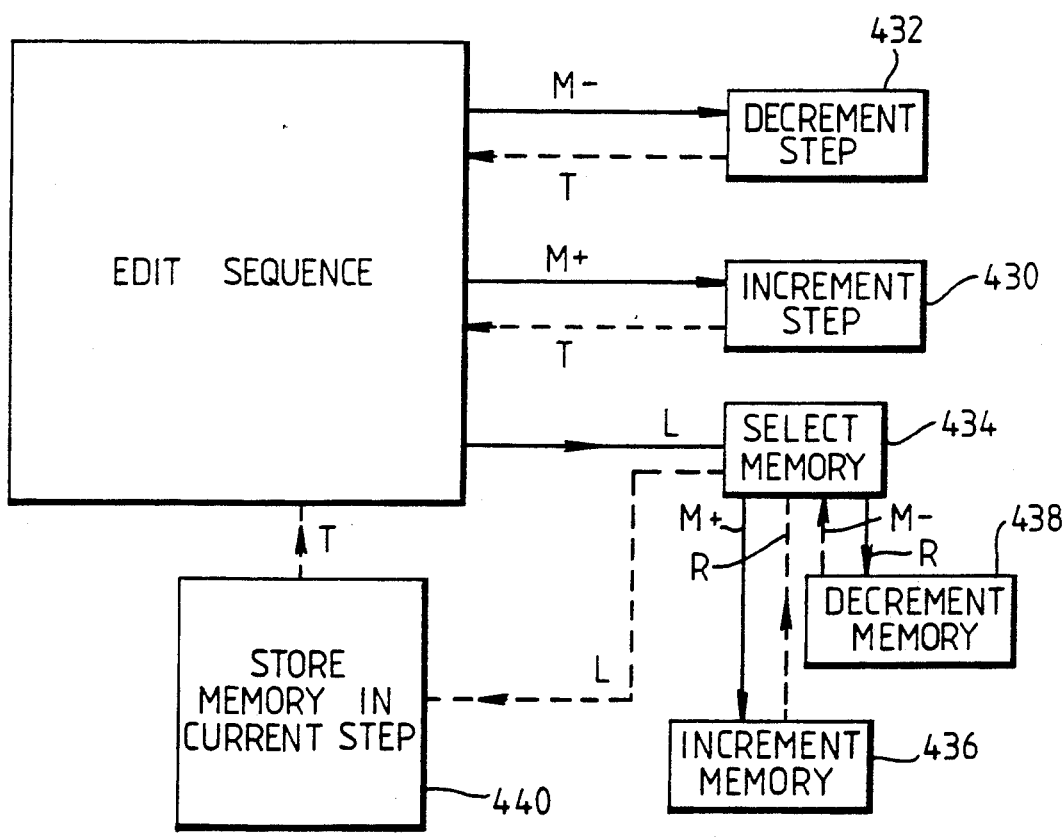

The Use sequence mode has a number of sub-modes, shown in FIG. 12 as follows:
426 - Increment step number i.e. to move along to the next stored memory number in the sequence. This is applicable where the user may only wish to perform part of a sequence. 428 - Decrement step number.

The Edit sequence mode has the following sub-modes:
430 - Increment the step number in the sequence to the next step (i.e. stored memory position) in the sequence. 432 - Decrement the step number in the sequence. 434 - Select the memory number to be inserted into the current sequence step, this sub-mode has three further sub-modes:
 (i). 436 - Increment the memory number.
 (ii). 438 - Decrement the memory number.
 (iii). 440 - Store the current memory number as the next sequence step.

The user can move between the various modes by pressing the M+ and M− buttons in suitable combinations for suitable periods of time as indicated by the arrows and symbols in FIGS. 10 to 13. The legend of these symbols is as follows:

O≡M+ or M−
A≡M+ & M− longer than 5 seconds
L≡M+ & M− less than 5 seconds
R≡release button
T≡Timeout It is desirable to construct the probe head in such a way that the battery life is as long as possible. To this end, the relative orientation of the printed circuit board 34 and the convergent surfaces provided by the balls 26 and 30 is such that the contacts 42 and 44 on the contact arm 40 will not be in contact with any of the radially extending conductive elements 36 (and thus will not be completing an electrical circuit) when the rollers 22 and 28 lie in register with a pair of convergent surfaces. If, when the head is locked, one of the contacts 42 or 44 is in contact with one of the radially extending conductive elements 36 then the liquid crystal display 400 shows the battery signal 402, indicating that there is a fault with the head relating to the battery.

Locking of the head is detected by a microswitch (not shown) actuable by rotation of the cam 32.

The pistons P may, if desired be used to provide the signals generated in this example by the conductive elements on the printed circuit board 34, and the contact arm 40. To this end, the pistons P may be arranged to complete an electrical circuit each time they are depressed during relative rotation of the support 12, rotor 14, and swivel 18 as they pass over the surfaces of the balls 26 and 30. In order to provide directional information, one piston in each set of three provided on the rotor 14 and swivel 18 respectively is slightly offset with respect to the convergent surfaces of the balls 26 and 30. This means that it would be depressed at a slightly different instant to the remaining two pistons on each of the rotor 14 and swivel 18.

We claim:

1. A manually operable probe head for orienting a probe on the quill of a coordinate positioning machine comprising a support connectable to the quill; a rotor to which a probe is connectable; means providing rotation of said rotor relative to the support; indexing means providing a plurality of mechanically defined rest locations at discrete orientations of said rotor relative to said support; and indicating means, said indicating means comprising:
    a display provided on the probe head;
    generating means provided on the probe head for generating on said display a unique visual signal in respect of each said rest location;
    a memory provided on the probe head for storing data corresponding to at least one of said rest locations; and
    means provided on the probe head for indicating the relative position of the rotor and the support corresponding to a rest location which is stored in the memory.

2. A probe head according to claim 1 wherein said indicating means comprises means for indicating an angular displacement of each said rest location from a reference position.

3. A probe head according to claim 1 further comprising means for generating an instruction and for generating on said display a visual signal representing said instruction, the instruction indicating a direction of rotation of the rotor relative to the support required for rotating the rotor to a rest location stored in the memory, from a rest location remote from the said stored rest location.

4. A probe head according to claim 3 further comprising means for generating a plurality of distinct said instructions in a predetermined sequence corresponding to a predetermined required sequence of orientation of the rotor relative to the support, and for generating on said display in said predetermined sequence a visual signal representing each of said instructions.

5. A probe head according to claim 4 further comprising means for generating an electrical signal when the rotor is rotated from one rest location to another.

6. A probe head according to claim 5 wherein said generating means further comprises a power source providing a voltage across a pair of electrical contacts in open circuit provided on one of the rotor and the support, and a conductive element provided in respect of each rest location on the other of said rotor and said support for forming a conducting link between said contacts when rotation of the rotor from one said rest location to another said rest location brings one of said elements and the contacts into register.

7. A probe head according to claim 6 wherein when the rotor is at a rest location at least one of the contacts is not in contact with a conductive element and no conductive link is formed.

8. A probe head according to claim 6 wherein each of said conductive elements extends radially with respect to said axis.

9. A probe head according to claim 6 wherein at each of said rest locations, the rotor is kinematically supported on the support.

10. A probe head according to claim 9 further comprising means providing axial movement of the rotor relative to the support to enable engagement of the rotor into, and disengagement of the rotor out of said kinematically supported condition, and wherein movement between rest locations is enabled by disengagement of the rotor out of said kinematically supported condition.

11. A probe head according to claim 10 further comprising means for indicating of said display when said rotor is in said kinematically supported condition.

12. A probe head according to claim 3 further comprising:
    a swivel mounted for rotation with the rotor about said axis and for rotation relative to the rotor about a further axis extending perpendicular to the first-mentioned axis;
    further indexing means providing a plurality of distinct further rest locations for said swivel relative to said rotor; and
    means for generating on said display a unique visual signal in respect of each said further rest location.

13. A probe head according to claim 12 further comprising a memory for storing data of the position of at least one of said further rest locations, and means for generating on said display a visual signal indicating when the relative position of said swivel and rotor corresponds to a further rest location which is stored in the memory.

14. A probe head according to claim 13 further comprising means for generating a further instruction and for generating on said display a visual signal representing said further instruction, the further instruction indicating a direction of rotation of the swivel relative to the rotor, for rotating the swivel to a location stored in the memory from a location remote from said stored location.

15. A probe head according to claim 14 wherein the probe is connectable to the rotor via the swivel.

16. A manually operable probe head for orienting a probe relative to a quill of a coordinate positioning machine, having a support connectable to the quill of the machine; a rotor to which said probe is connectable, mounted to the support; means providing rotation of the rotor relative to the support about an axis, said rotor being manually rotatable about said axis; means providing a plurality of mechanically defined rest locations at discrete orientations of said rotor relative to said support; and an indicating mechanism provided on the probe head, the indicating mechanism comprising:

a plurality of elongate conductive elements provided on one of the rotor and support;

a contact arm provided on the other of the rotor and support for contacting said elements, and completing an electrical circuit upon relative rotation of the rotor and the support;

a power source providing a voltage in said circuit, thereby to generate a signal in said circuit; and means provided on the probe head for determining an incremental count of said signals, and for generating on a visual display provided on the probe head a visual signal representing the instantaneous position of the rotor relative to the support on the basis of the incremental count;

a memory provided on the probe head for storing data corresponding to at least one of said rest locations; and means provided on the probe head for indicating the relative position of the rotor and the support corresponding to a rest location which is stored in the memory.

17. A probe head according to claim 16 wherein said rotor is axially movable relative to said support, and means are provided for spring-loading said contact arm to accommodate said relative axial movement.

18. A probe head according to claim 16, wherein:
one of said conductive elements is provided in each of said rest locations;
said contact arm comprises a pair of electrical contacts; and
said electrical circuit is complete when rotation of said rotor from one rest position to another brings an element into register with the contacts.

19. A probe head according to claim 18, wherein when the probe is in a rest position at least one of the contacts is not in register with a conductive element and no electrical signal is generated.

20. A probe head according to claim 18 wherein each of said conducting elements extends radially with respect to said axis.

21. A probe head according to claim 18 comprising two pairs of electrical contacts provided on said one of said rotor and said support, wherein said pairs are positioned so as to form a conducting link at different instances in time during rotation of the rotor from one rest position to another.

22. A probe head according to claim 21 wherein:
each of said conducting elements extends radially with respect to said axis;
a further conducting element is provided on said other of the rotor and support, said further conducting element extending circumferentially with respect to said axis;
each of said pairs of electrical contacts comprises a first contact for contacting a radially extending conducting element, and a common contact for contacting said circumferentially conducting element; and
said first contacts are offset in a circumferential direction relative to each other.

* * * * *